United States Patent
Lotto et al.

(10) Patent No.: US 8,119,972 B2
(45) Date of Patent: Feb. 21, 2012

(54) SOLID-STATE IMAGE SENSING DEVICE HAVING A LOW-PASS FILTER FOR LIMITING SIGNAL FREQUENCIES PASSING TO THE OUTPUT NODE OF AN INVERTING AMPLIFIER

(75) Inventors: Christian Lotto, Zurich (CH); Peter Seitz, Urdorf (CH)

(73) Assignee: CSEM Centre Suisse D'Electronique Et De Microtechnique SA - Recherche Et Developpement, Neuchatel (CH)

( * ) Notice: Subject to any disclaimer, the term of this patent is extended or adjusted under 35 U.S.C. 154(b) by 286 days.

(21) Appl. No.: 12/512,307

(22) Filed: Jul. 30, 2009

(65) Prior Publication Data
US 2010/0051786 A1 Mar. 4, 2010

(30) Foreign Application Priority Data
Sep. 1, 2008 (EP) ..................................... 08163384

(51) Int. Cl.
*H01J 40/14* (2006.01)
(52) U.S. Cl. ................. 250/214 R; 250/208.1
(58) Field of Classification Search ............. 250/214 R, 250/214.1, 208.1, 214 AG; 348/241–253, 348/308–311; 257/290–292, 440
See application file for complete search history.

(56) References Cited

U.S. PATENT DOCUMENTS

| 6,350,981 B1 * | 2/2002 | Uno ........................... 250/214 R |
| 7,317,214 B2 | 1/2008 | Watanabe |
| 7,550,705 B2 | 6/2009 | Seitz et al. |
| 2005/0116264 A1 | 6/2005 | Watanabe |
| 2007/0108375 A1 | 5/2007 | Olsen et al. |
| 2007/0267578 A1 | 11/2007 | Seitz et al. |

FOREIGN PATENT DOCUMENTS

| EP | 1643754 A1 | 9/2004 |
| EP | 1538828 A2 | 6/2005 |

\* cited by examiner

*Primary Examiner* — Que T Le
(74) *Attorney, Agent, or Firm* — Martin Fleit; Paul D. Bianco; Fleit Gibbons Gutman Bongini & Bianco PL

(57) ABSTRACT

The present invention refers, inter alia, to pixel circuits. The pixel circuit according to embodiments of the invention may include a photo-sensitive device having charge storage capability connected to a sense node. The pixel circuit may further include an inverting amplifier which is able to amplify a voltage from the sense node to a voltage on an output node of the amplifier, when being operated in open-loop configuration; and a reset switch being able to connect the input and output nodes of the inverting amplifier and thus to reset the inverting amplifier to an operating point providing high open loop gain by temporarily establishing negative feedback. Moreover, the pixel circuit may include a low-pass filter at the output node of the inverting amplifier for limiting the signal frequencies passing to the readout node to those frequencies that contain useful signal information. Additional and alternative embodiments are specified and claimed.

16 Claims, 11 Drawing Sheets

SOLID-STATE IMAGE SENSING DEVICE HAVING A LOW-PASS FILTER FOR LIMITING SIGNAL FREQUENCIES PASSING TO THE OUTPUT NODE OF AN INVERTING AMPLIFIER

CROSS-REFERENCE TO RELATED APPLICATIONS

The present invention claims priority from EP patent application 08 163 384.4 filed on Sep. 1, 2008, the application which is incorporated herein by reference in its entirety.

FIELD OF THE INVENTION

The present invention relates to solid-state photo sensors and more specifically, to solid-state image sensor enabling one-dimensional and two-dimensional imaging.

DESCRIPTION OF THE FIGURES

These and further features and advantages of the invention will become more clearly understood in the light of the ensuing description of some embodiments thereof, given by way of example only, with reference to the accompanying figures, wherein.

Figure 1:
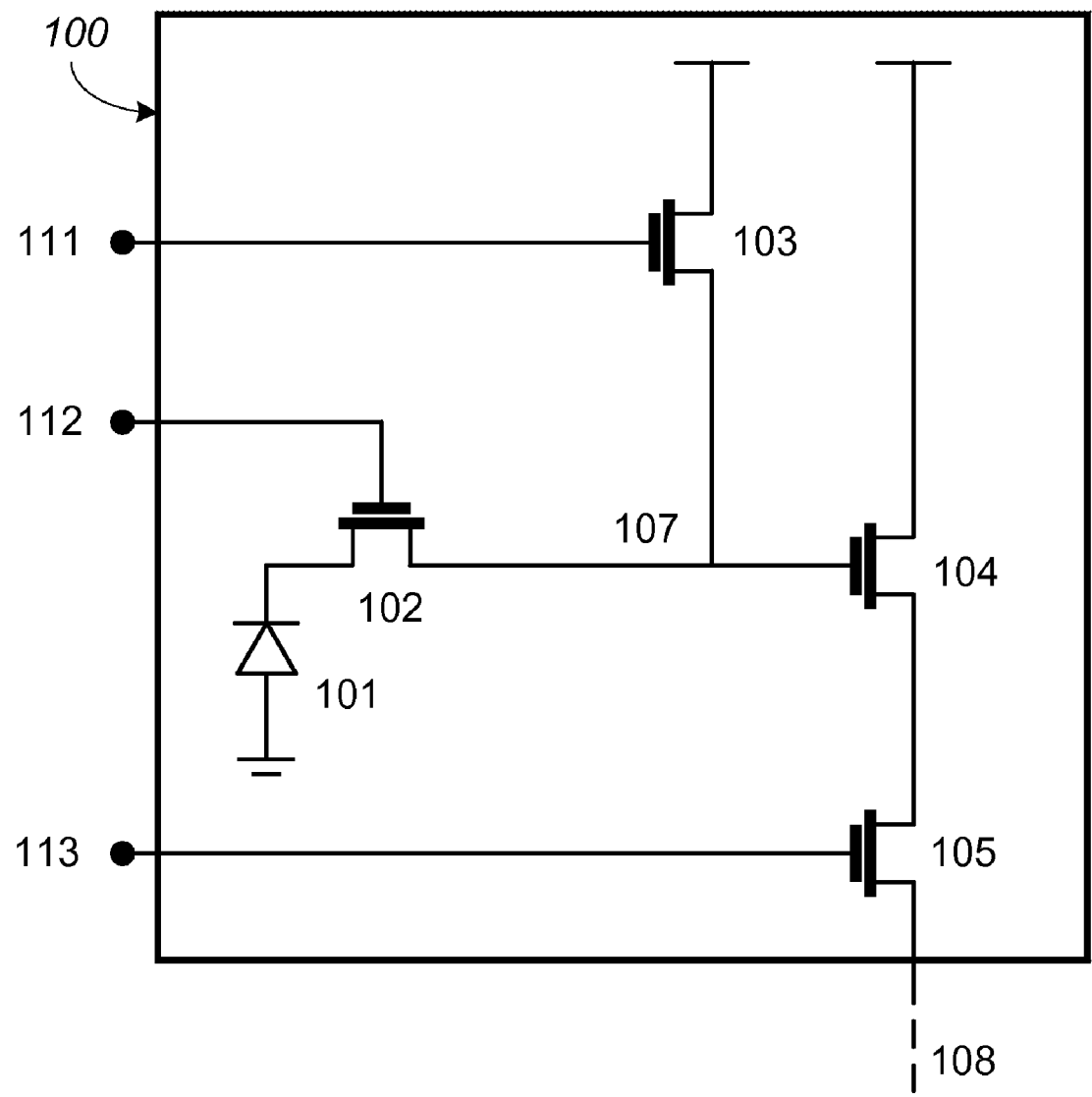
FIG. 1 is a schematic illustration of an active pixel sensor array according to the prior art.
Figure 1:
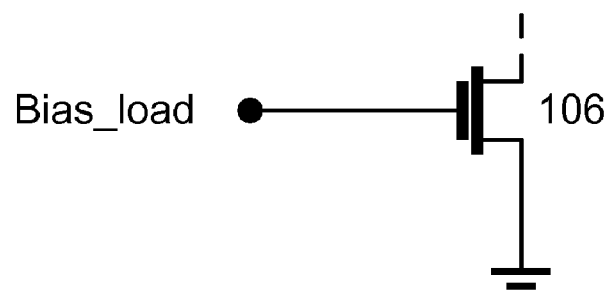

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals and/or letters may be repeated among the figures to indicate identical or analogous elements but may not be referenced in the description for all figures.

BACKGROUND OF THE INVENTION

The reduction of noise and dark current in solid-state image sensors whilst still maintaining high dynamic range are of major interest. With reference to FIG. 1, state of the art Complementary Metal Oxide Semiconductor (CMOS) image sensors pixels 100 usually contain a photo-sensitive device 101 that may have charge storage capability, a transfer gate 102 controlled by a transfer control signal 112 enabling complete charge transfer from the photo-sensitive device onto a sense node 107; a reset switch 103, which is controlled by a reset control signal 111, whereby reset switch 103 is used for resetting sense node 107 to a fixed reset potential; a source follower buffer 104 and a pixel select switch 105 for coupling the pixel to a column line 108 shared between several pixels. A load device 106 such as a current source, combined to the pixel buffering transistor forms a source follower buffer, wherein 106 is usually connected to the column line.

An example operation sequence for this pixel would contain the steps of first integrating electrons generated by impinging light in the photo-sensitive device, subsequently activating pixel select switch 105 via a pixel select signal (not shown) then pulsing the reset control signal 111 of reset switch 103 in order to reset sense node 107 while pixel select switch 105 is still activated and finally pulsing transfer control signal 112 in order to transfer the integrated signal charge onto sense node 107 while pixel select switch 105 is still activated. By employing such a sequence, the reset level of sense node 107 as well as the sum of the reset level and the signal level corresponding to the light detected by photo-sensitive device 101 appear consecutively on the column line. Therefore, by computing the difference between said consecutively outputted sum and the reset level the signal level may be determined.

The above-described operating method is known as Correlated Double Sampling (CDS) and suppresses Fixed Pattern Noise (FPN) and reset noise corresponding to the sampled and held temporal noise of reset switch 103. Furthermore, a reduction of low frequency noise (mainly 1/f noise) of source follower buffer 104 is achieved.

White noise of source follower buffer 104 is another important noise source in state of the art solid state image sensors. Bandwidth engineering methods such as disclosed in European Patent 1 643 754 (Lustenberger et al.) may be applied to control the bandwidth and minimize white noise of the signals read out from the pixel whilst still maintaining a given pixel readout time, which is usually defined by the frame rate and pixel count or row count of the image sensor.

Downstream circuitry used for signal conditioning such as CDS, amplification and buffering introduces noise of various natures.

Pixel architectures using amplifiers and feedback capacitors forming capacitive feedback transimpedance amplifiers (CTIAs) are disclosed in European Patent 1 538 828 (to Watanabe) and in US Patent 2007/0108375 (to Olsen et al.). This architecture can provide pixel conversion factor independently of the sense node capacitance.

SUMMARY OF SOME EMBODIMENTS OF THE INVENTION

The present invention refers, inter alia, to pixel circuits. The pixel circuit according to embodiments of the invention may include a photo-sensitive device having charge storage capability connected to a sense node. The pixel circuit may further include an inverting amplifier which is able to amplify a voltage from the sense node to a voltage on an output node of the amplifier, when being operated in open-loop configuration; and a reset switch being able to temporarily establish negative feedback by connecting the input and output nodes of the inverting amplifier and thus to reset the inverting amplifier to an operating point providing high open loop gain. Moreover, the pixel circuit may include a low-pass filter at the output node of the inverting amplifier for the limitation of the signal frequencies passing to the readout node to those frequencies that contain useful signal information.

In embodiments, the photo-sensitive device may for example be connected to the sense node across a transfer gate enabling controlled complete charge transfer from the storage area of the photo-sensitive device to the sense node.

In embodiments of the invention, the pixel circuit may for example further include a select switch for connecting the at least one pixel circuit to a signal line.

In embodiments, the photo-sensitive device may for example be implemented by a buried photodiode, a pinned photodiode, a charge coupled device (CCD), a photogate device, and any other suitable photo-sensitive device.

In embodiments, the inverting amplifier may for example be implemented at least with one of the following devices: Metal Oxide Semiconductor (MOS) devices, such as a single MOS transistor; and passive circuit elements. At least one of the devices employed by the inverting amplifier may be manufactured by MOS fabrication technologies.

In embodiments, the transfer gate, the reset switch and, if present, the select switch may for example be implemented by MOS transistor devices.

In embodiments, the inverting amplifier has a gain that for example increases with a corresponding decrease in the light intensity for light being detected by the photo-sensitive device.

In embodiments of the invention, the inverting amplifier may for example include at least one transistor device, and at least one cascode transistor device biased in a manner to keep the potential at the drain terminal of the amplifier input transistor nearly constant for a range of amplifier output voltages including the range corresponding to low intensities of the light impinging on the photo-sensitive device.

The present invention further discloses a method of operating the pixel circuit with a select switch control signal. In embodiments of the invention, the method may for example include the following procedures: configuring, by a first value of the select signal, the select switch, as an open switch to isolate the pixel circuit from the corresponding at least one pixel signal line; configuring, by a second value of the select signal, the select switch as a cascode transistor to connect the pixel output signal to the corresponding at least one signal line; and providing reduced effective parasitic capacitance between the corresponding sense node and signal line for a range of output voltages of the amplifier including the range corresponding to low light intensities, whilst the pixel circuit is isolated from and whilst the pixel output signal is connected to the corresponding at least one signal line.

In embodiments, the pixel circuit may for example further include a capacitor connected between the sense node and the drain terminal of the inverting amplifier input transistor.

In embodiments, the method may for example further include using a controlled slow edge of the reset control signal for turning the reset action off in order to maintain negative feedback during at least some of the reset signal transition.

The present invention further discloses a solid-state image sensor comprising a matrix of the pixel circuits.

In embodiments, the solid-state imaging device may for example include a plurality of control lines, each one connected to a plurality of the pixel circuits allowing controlling reset action, transfer action and select action of the pixel circuits.

In embodiments, the solid-state imaging device may for example further include a plurality of shared pixel signal lines each one offering the possibility to be connected to a plurality of the pixels circuits.

In embodiments, the solid-state imaging device may for example include shared circuitry connected to the signal lines such as load devices, filtering capacitors and signal processing circuits.

In embodiments, the functionality of each one of the plurality of signal processing circuits connected to corresponding pixel signal lines includes either one correlated double sampling (CDS) and correlated multiple sampling.

DESCRIPTION OF THE EMBODIMENTS OF THE INVENTION

Generally, embodiments of the present invention offer excellent immunity against downstream circuit noise without being limited by the sense node capacitance, and the invention overcomes the trade-off between conversion factor and dynamic range proper to linear amplification methods as outlined herein below. This is achieved while still providing low device count and area, thus providing for high values of optical fill factor in the pixels. In particular, the invention relates to an image sensor and a method for operating the image sensor including a pinned photodiode and/or a charge-coupled device and/or on-pixel voltage amplification.

Further, the invention relates, inter alia, to Complementary Metal Oxide Semiconductor (CMOS) image sensors whose photo-sensitive devices may be embodied by pinned photodiodes (PPD); and CMOS-charge coupled devices (CCD) hybrid image sensors whose photo sensitive area may be embodied, inter alia, by CCDs.

In order to improve the ratio of signal over downstream circuit noise, it is preferable to maximize the pixel conversion factor $\Delta Vout/\Delta Qin$, wherein Vout is the pixel output voltage and Qin the amount of charges detected in the pixel in response to corresponding light intensity impinging on the pixel. In the case of the image sensor described with reference to FIG. 1, using source follower buffer 104 wherein the gain is limited to values close to unity results in that the charge sensitivity is mainly a function of the capacitance of sense node 107. The minimum practical value of said capacitance depends on the processing technology used to fabricate the image sensor.

Solid-state image sensors according to embodiments of the invention achieving very low noise levels approaching a single electron may include, inter alia, the following elements:

1. An open-loop inverting voltage amplifier providing gain significantly greater than unity in its range of input voltages, which correspond to low levels of the impinging light intensities.
2. A switch allowing to temporarily apply negative feedback to the amplifier in order to reset said amplifier to an operating point in its range of high gain.
3. A low-pass filter limiting the signal and noise bandwidth of the amplifier.
4. A photo-sensitive device that may have charge storage capability.

According to some embodiments of the invention, the photo-sensitive device may allow full charge transfer from the charge storage zone onto the sense node. It should be noted that term "full" as well as grammatical variations thereof also encompasses the meaning of the term "substantially full".

The use of such a photo-sensitive device allows applying Correlated Double Sampling (CDS) or correlated multiple sampling, thereby obtaining correlated reset and signal levels read out within a short period of time. It therefore allows attenuating flicker noise mainly occurring in the amplifier for relatively high frequencies. For example, a imaging device comprising of more than 1 million pixels that can be readout at frame rates ranging, for example, from 10 to 100 frames per second, flicker noise of up to frequencies in the range of kilohertz can be eliminated. It should be noted that term "eliminated" also encompasses the meaning of the term "substantially eliminated". The low frequency noise suppression possible for such a detector with full charge transfer capability is therefore superior to the noise suppression allowed by a detector providing incomplete or no charge transfer delivering correlated reset and signal levels only within a period at least as long as the signal integration time. Furthermore, the fast consecutive readout of reset and signal levels allows simple sharing of circuitry for CDS among several pixel circuits without the need for any additional analog or digital memory. It is important to point out that such a photo-sensitive device including a readout node disconnected from a photoconversion zone allows for low values of the sense node capacitance (e.g., 1 femtoFarads-10 femtoFarads) and thus high conversion factor even for large detector areas. Photo-sensitive devices with the described characteristics may for example be implemented by a buried photodiode, a pinned photodiode, a CCD, and photogate devices. Correspondingly, the imaging device according to an embodiment of the invention can produce very low noise images, approaching room-temperature (e.g., 23° C.) noise values equal or close to one electron (e.g., <10 electrons, or <5 electrons), inter alia, because of at least one of the following reasons:

1. The effect of noise from downstream circuitry is reduced effectively due to the gain of the amplifier in the pixel, resulting in high conversion factors $\Delta Vout/\Delta Qin$.
2. Limited signal bandwidth and thereby reduction of white noise from the pixel amplifier can be achieved using reasonably low values of output signal load capacitance, due to the bandwidth limiting effect of gain and can thus be implemented using little semiconductor area.
3. Reset noise (temporal noise on the sense node originating from the reset switch and the amplifier during the reset phase being sampled and held when opening the reset switch) can be eliminated using the CDS method.
4. Fixed pattern noise can be eliminated using double sampling.
5. Flicker noise from the amplifier is effectively reduced by CDS due to the low time difference between the reset and signal level sampling, as explained above.

In order to substantiate the assertions made above, we consider the signal and noise frequency shaping applied for the case where the pixel circuit according to the present invention is combined with a CDS procedure. The high pass transfer function corresponding to the CDS procedure may correspond to the following equation (1):

$$|H_{CDS}(\omega)| = \left|2\sin\left(\frac{\omega T_{CDS}}{2}\right)\right| \quad (1)$$

It should be noted that other equations may be used to describe the high pass transfer function.

$T_{CDS}$ represents the sampling time difference between sampling the correlated reset and signal levels. Note that the high-pass transfer function has an amplitude equal to zero at $\omega=0$, thus completely eliminating reset noise (DC noise) and Fixed Pattern noise (fixed amplifier reset level offset between different pixel circuits).

The pixel-amplifier and the signal line load form a continuous-time low-pass filter, whose transfer function may be expressed by the following equation (2):

$$H_{amp}(\omega) = \frac{A_V}{1 + \frac{j\omega}{(gm/A_V C_{load})}} \quad (2)$$

$A_V$, gm and $C_{load}$ are the pixel-amplifier's DC voltage gain, the pixel-amplifier's transconductance and the pixel-amplifier's load capacitance, respectively. It should be noted that other equations may express the transfer function.

The pixel-amplifier's thermal noise has essentially a white noise spectral density, and may be, inter alia, shaped by the low-pass transfer function of the pixel amplifier itself and the high-pass transfer function of the CDS process. The thermal root-mean-square (rms) noise figure is obtained by integrating the white noise spectral power density multiplied by both of the above transfer functions in the frequency domain. For a well-dimensioned design, the CDS sampling time difference is well above amplifier settling time. In this situation the low-frequency white noise attenuation effect can be neglected and the rms thermal noise equivalent charge concerning the pixel-amplifier input may be given by the following equation (3), assuming the thermal noise is dominated by the amplifier input transistor:

$$q_{thermal,in} \approx \sqrt{2}\, C_{SN} \sqrt{\frac{kT}{A_V C_{load}}} \quad (3)$$

$C_{SN}$ represents the effective capacitance of the sense node and the square root of 2 reflects the fact that 2 samples are taken in order to perform CDS. It should be noted that other equations may be used to describe the rms thermal noise equivalent charge input to the pixel-amplifier. We note that the bandwidth-limiting effect of amplification results in low thermal noise without having to use large capacitors.

For evaluating the contribution of flicker noise, the low-frequency shaping due to the CDS operation is important and can provide significant low-frequency noise attenuation. The flicker noise input referred equivalent charge may be described by the following equation (4), under the assumption that the flicker noise is dominated by the contribution of the amplifier input transistor:

$$q_{flicker,in} = C_{SN} \sqrt{\int_0^\infty \left(\left|\frac{H_{amp}}{A_V}\right|^2 |H_{CDS}|^2 \frac{K}{C_{gate}} \frac{2\pi}{\omega}\right) d\omega} \quad (4)$$

$C_{gate}$ represents the gate oxide capacitance of the amplifier input transistor and K is a process dependent flicker noise parameter. It should be noted that other equations may be used to describe the above-mentioned flicker noise input referred equivalent charge. The assumption that flicker noise is dominated by the contribution of the input transistor is reasonable for the case of a small amplifier input device present in every single pixel circuit of an array of pixels and further parts of the amplifier being significantly larger as they may be shared among a plurality of pixel circuits. Defining $f_{eq,CDS}$ as the corner frequency of an equivalent $1^{st}$ order highpass-filter yielding the same flicker-noise suppression as the CDS method results, for example, in the following approximation:

$$q_{flicker,in} \approx C_{SN}\sqrt{\frac{K}{C_{gate}}\ln\left(\frac{f_{amp,BW}}{f_{eq,CDS}}\right)} \quad (5)$$

$f_{amp,BW}$=gm/($2*\pi*A_V*C_{load}$) represents the amplifier bandwidth and $f_{eq,CDS}$ is inversely proportional to the sampling time difference $T_{CDS}$ in a first approximation. It should be noted that other equations may represent the approximation.

We can see the interest of minimizing the ratio of the amplifier bandwidth and the equivalent CDS high-pass frequency to obtain a reduction of the flicker noise. Accordingly, having a pixel circuit being able to deliver reset and signal levels that may correlate with each other within a short period ultimately limited only by the amplifier settling time, may enable reducing flicker noise.

Assuming an amplifier open loop gain of a few ten times, an amplifier transconductance of a few tens of µS, a load capacitance of a few pico-Farads, sense node capacitance and amplification transistor gate capacitance of a few femto-Farads, a CDS sampling time difference equal to a few times the amplifier time constant and a flicker noise constant K of $10^{-25}$ $V^2F$ to $10^{-24}$ $V^2F$, it is possible to achieve input-referred rms charge read noise (amplifier thermal and flicker noise) in the range of one electron to a few electrons.

Assuming the above-mentioned values, the acceptable rms noise of downstream circuits such as column parallel readout and signal processing circuits can be as high as a few hundred microvolts without compromising the noise performance, thanks to the high conversion factor due to the use of open loop amplification.

In a second aspect of the present invention, an open-loop inverting voltage amplifier has a compressive lower gain in its range of input voltages corresponding to high light intensities (e.g., $\geq$5000 photoelectrons per pixel area and per exposure time) than in the range corresponding to low light intensities (e.g., <5000 photoelectrons per pixel area and per exposure time) is used as a pixel voltage amplifier, or more specifically:

$$|amplifier\_open\_loop\_voltage\_Gain(Q_{in1})| > \quad (6)$$
$$|amplifier\_open\_loop\_voltage\_Gain(Q_{in2})| if |Q_{in1}| < |Q_{in2}|$$

wherein $Q_{in1}$ and $Q_{in2}$ are the amount of charges detected in the pixel in response to corresponding first and second light intensities impinging on the pixel, respectively. Therefore:

$$\left|\frac{dVout1}{dQin1}\right| > \left|\frac{dVout2}{dQin2}\right| if |Q_{in1}| < |Q_{in2}| \quad (7)$$

wherein $V_{out1}$ and $V_{out2}$ are the voltages at the output of the open-loop inverting voltage amplifier in response to first and second detected light intensities. Considering the absolute value of the amplification stems from the fact that the inverting open-loop amplifier gain effects a negative gain and the charges detected in response to light impinging on the pixel may be negative (electrons) or positive (holes).

In embodiments of the invention, the non-linear property of the open loop inverting amplifier is thus deliberately used for increasing dynamic range (e.g., to at least 100 dB) of the imaging device. It is therefore possible to use high conversion factors ($dV_{out}/dQ_{in}$) at low light intensities without excessively restricting the signal swing and thus the dynamic range of the pixel circuit. It is worth pointing out that amplitude compression is achieved without using any additional devices or circuits in the pixel, which would reduce the pixel fill factor and which would compromise the conversion factor by increasing the sense node capacitance. In this way, no need exists for multiple pixel readout in several different modes, therefore not compromising the trade-off between readout speed and noise bandwidth.

The present invention offers excellent immunity against downstream circuit noise without being limited by the sense node capacitance, and the invention overcomes the trade-off between conversion factor and dynamic range proper to linear amplification methods. This is achieved while still providing low device count and area, thus providing for high values of optical fill factor in the pixels.

Figure 2:
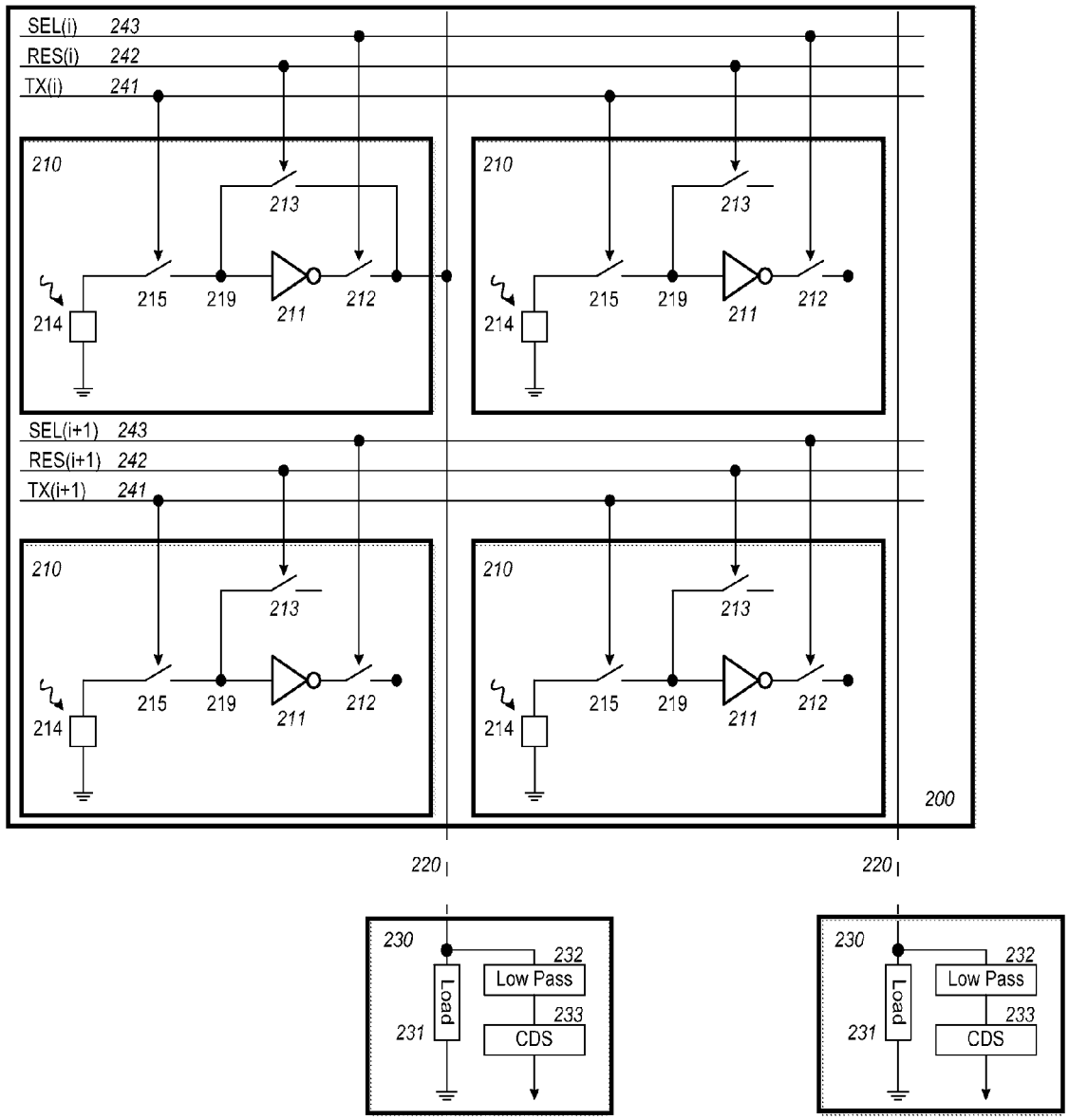
FIG. 2 is a schematic illustration of a section of an electronic circuit of a sensor array according to an embodiment of the invention.

Reference is now made to FIG. 2. According to some embodiments of the invention, an image sensor may include at least one matrix 200 of pixel circuits 210. It should be noted that the number of pixel circuits 210 of matrix 200 schematically illustrated in FIG. 2 is not to be construed as limiting, as matrix 200 may include in other embodiments of the invention fewer or more pixel circuits 210 in various configurations. In the exemplary embodiment that is schematically illustrated in FIG. 2, matrix 200 may comprise two rows and two columns of pixel circuits 210. Each pixel circuit 210 may include a photo-sensitive device 214 having charge storage capabilities, a transfer gate 215 connected to photo-sensitive device 214 and to a sense node 219, being able to transfer signal charge from photo-sensitive device 214 onto sense node 219, an open loop inverting amplifier (hereinafter simply referred to as "amplifier") 211 with its input connected to sense node 219, a select switch 212 with one terminal connected to the output of amplifier 211 and one terminal connected to pixel signal line 220 and a reset switch 213 connected to sense node 219 and pixel signal line 220. If reset switch 213 is closed while select switch 212 is closed, reset switch 213 allows temporarily applying negative unity gain feedback to inverting amplifier 211. In an alternative embodiment of the invention, one terminal of reset switch 213 may be connected to the output of amplifier 211 instead to pixel signal line 220. The image sensor may further include a number of pixel signal lines 220, each one being connected to at least one pixel circuit 210 and to at least one shared circuitry 230. The at least one shared circuitry 230 may share and/or include elements of voltage amplifier 211 such as biasing or load devices 231, low-pass filter 232 applied to the pixel output signal, reducing temporal noise of amplifier 211, and signal processing circuits 233 performing processing tasks that may include but are definitely not necessarily limited to CDS. Low-pass filter element 232 may include a load capacitance to limit the bandwidth of amplifier 211.

The image sensor may further include a number of control lines 241, 242, 243 for controlling pixel transfer gate 215, pixel reset switch 213 and pixel select switch 212, respectively. Each control line 241, 242 and 243 may be connected to at least one pixel circuit 210.

Figure 3:
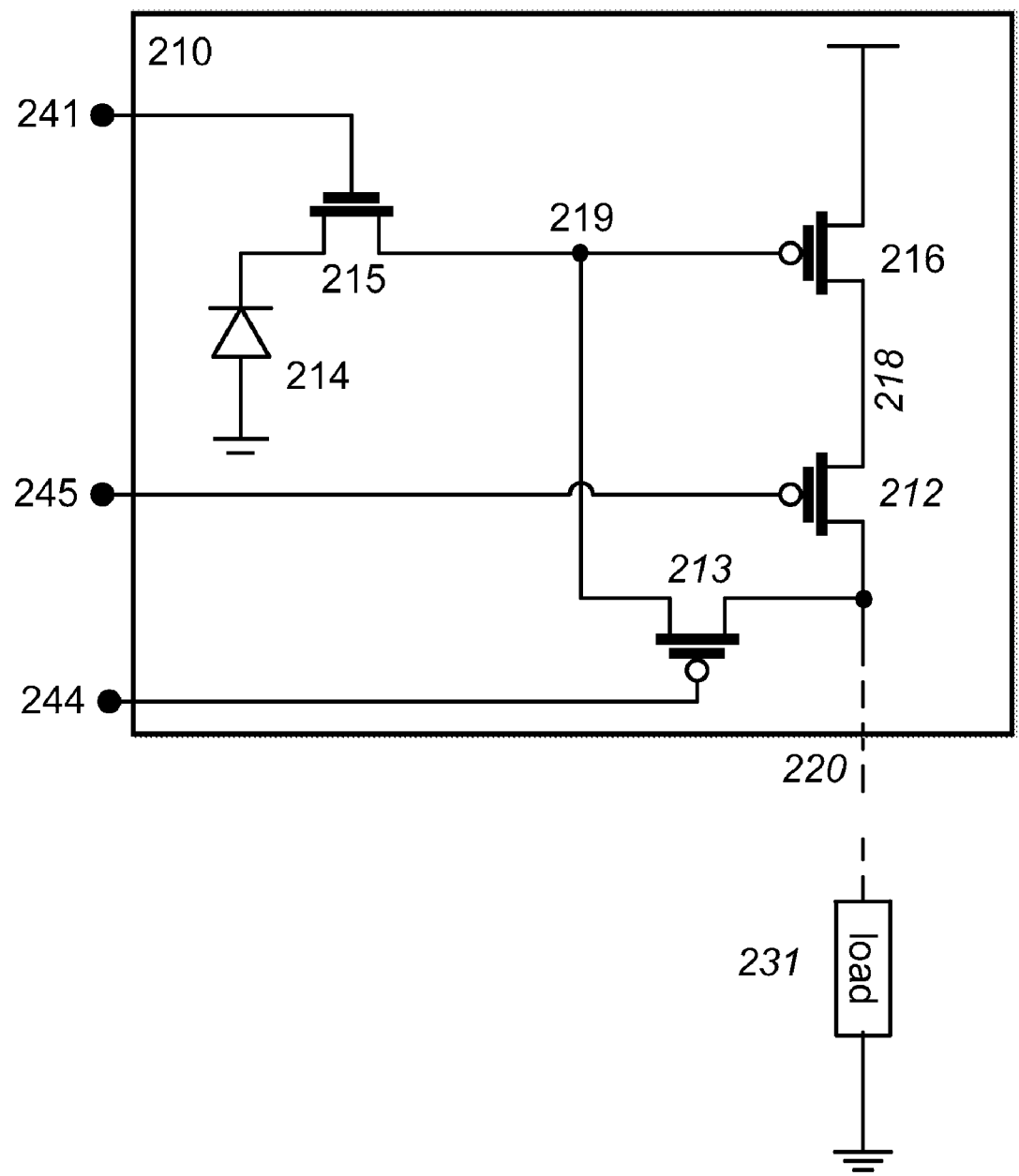
FIG. 3 is a schematic illustration of an imaging circuit according to an embodiment of the present invention.

An embodiment of pixel circuit 210 employing CMOS processing technology is schematically illustrated in FIG. 3. In this embodiment transfer gate 215 may be an n-channel MOS transistor, reset switch 213 may be implemented as a p-channel MOS transistor, select switch 212 may be a p-channel MOS transistor, and voltage amplifier 211 may be made of a p-channel amplifier input transistor 216 located in each pixel circuit and load device 231, which may be shared between all pixel circuits 210 being connected to the same pixel signal line 220. As the pixel section of this embodiment may include only four MOS devices besides the photo-sensitive device, high pixel fill factors can be achieved.

It should be noted that the choice of n-channel and/or p-channel devices for the different functions according to some embodiments of the present invention is not to be construed as limited to the configuration of the embodiment schematically illustrated in FIG. 3. Consequently, any other combination of n-channel and/or p-channel transistors may be possible, offering different advantages and disadvantages in terms of noise, fill factor and signal swing. As an example, in FIG. 4 another embodiment of pixel circuit 210 is schematically illustrated, wherein all MOS devices are n-channel type, thus offering optimized fill factor since it is not necessary to work with both n-type tubs and p-type tubs in the pixel.

Figure 5:
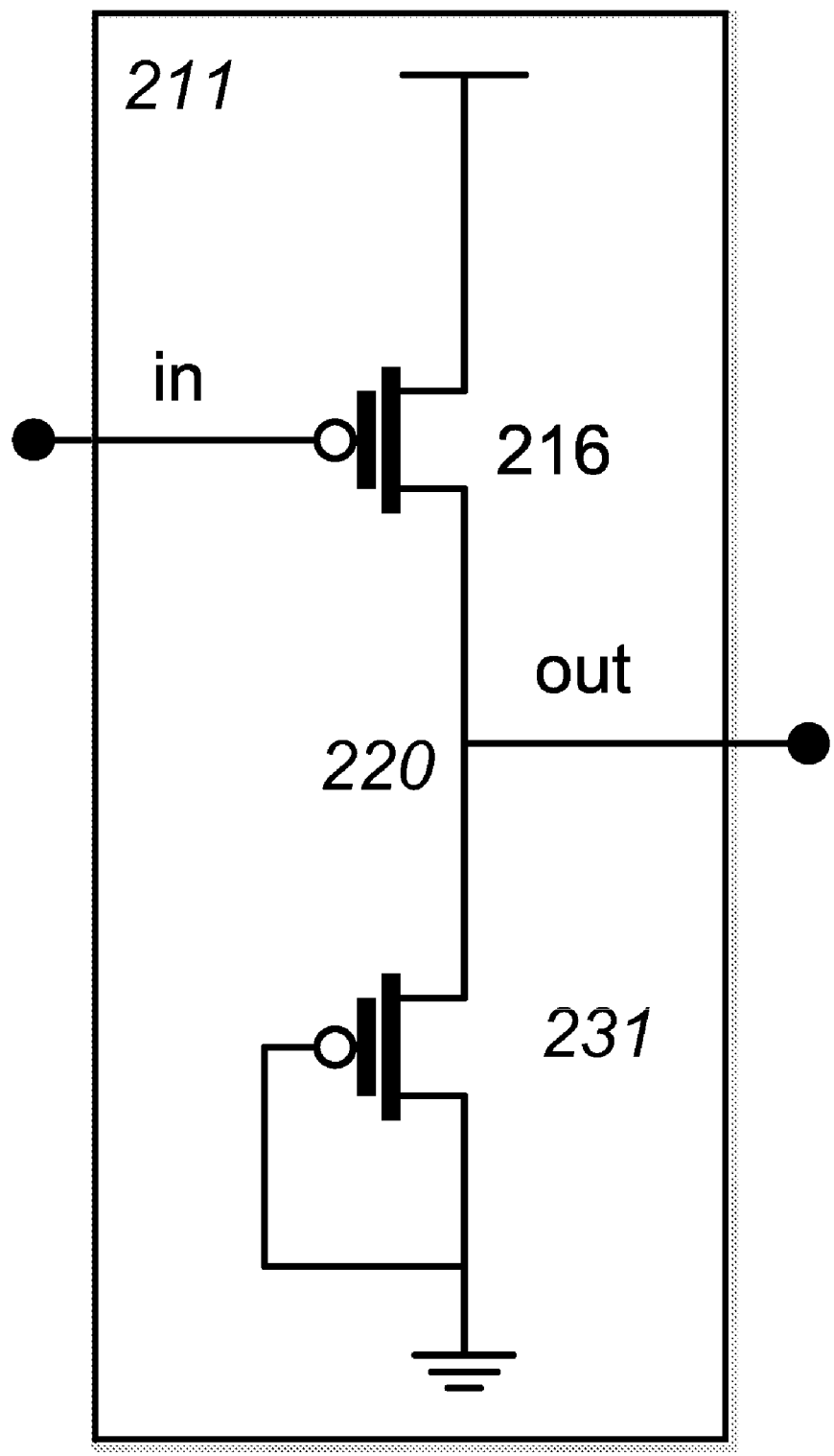
FIG. 5 is a schematic illustration of an amplifier with compressive nonlinearity according to an embodiment of the invention, which may be formed by combining the imaging circuit that is schematically illustrated in FIG. 3 with an appropriate load device.

According to an alternative embodiment of the present invention, amplifier 211 may have a non-linear open loop behavior and may therefore enhance the dynamic range of the image sensor. This is accomplished if amplifier 211 has compression characteristics, i.e. if amplifier 211 provides high gain for the range of input voltages close to its reset voltage, corresponding to low amounts of signal charge transferred from photo-sensitive device 214 onto sense node 219, and providing lower gain in the range of input voltages corresponding to larger amounts of input signal charge. As schematically illustrated in FIG. 5, amplifier 211 having such characteristics may comprise an in-pixel common source amplifier input transistor 216 and a p-channel MOS load device 231 with its source connected to the signal line 220 and its gate and drain connected to a fixed potential such as the ground potential. In some embodiments, amplifier 211 may be implemented by a single MOS transistor per pixel circuit and at least one further component shared among a plurality of pixel circuits.

Figure 6:
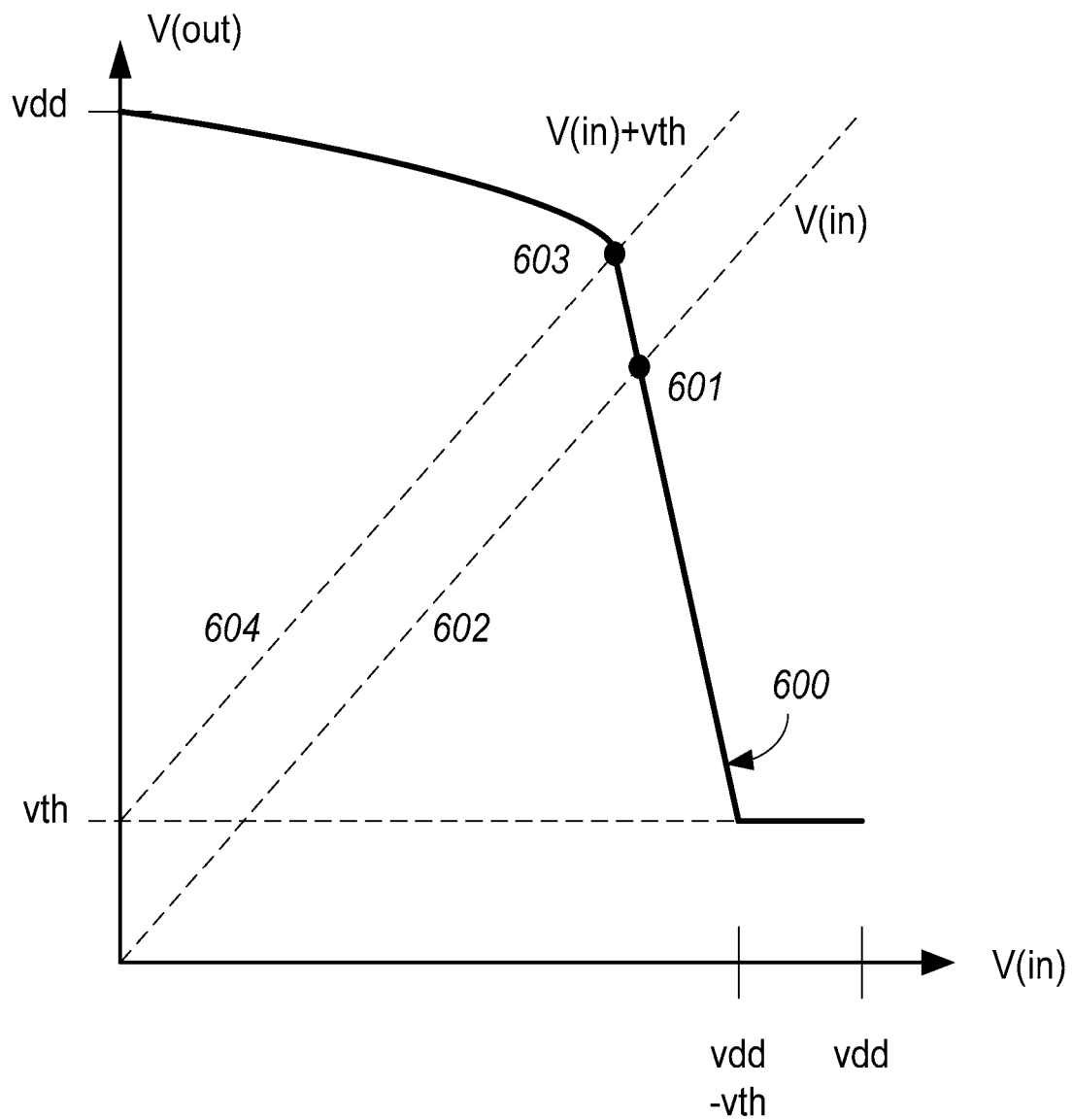
FIG. 6 is a graph which schematically illustrates the transfer characteristic of the amplifier of FIG. 5.

Referring now to FIG. 6, amplifier 211 schematically illustrated in FIG. 5 provides linear high gain amplification behavior in the vicinity of its reset point 601 found at the intersection of the amplifiers input-to-output transfer function 600 and a line 602, corresponding to equal input and output voltages. At an operating point 603 inverting amplifier 211 enters its nonlinear regime due to the transition of the amplifier input transistor operating regime from saturated to linear (triode) mode. Operating point 603 is found at the intersection of amplifier input-to-output transfer function 600 and a line 604 defined by an output voltage equal to the sum of input voltage and a threshold voltage Vth of amplifier input transistor 216.

The gain in the linear region of amplifier 211 may be described, for example, by the following equation (8):

$$Gain_{linear} = -\frac{W_{amp}L_{load}}{W_{load}L_{amp}} \quad (8)$$

It should be noted that other equations may be used to describe the gain in the linear region. It should further be noted that the term "linear" as used herein also encompasses the meaning of the term "substantially linear".

Whereas the gain at Vin=0 may approximately be given by the following equation (9):

$$Gain_{v=0} = -\frac{1}{2}\frac{1}{\left(1+\frac{W_{amp}L_{load}}{W_{load}L_{amp}}\right)^2} \quad (9)$$

$W_{amp}$, $L_{amp}$, $W_{load}$ and $L_{load}$ represent the gate width and length of the amplifier input transistor 216 and the gate width and length of load device 231, respectively. For moderately high values of the gain in the linear region of factors of, e.g., 5 to 50, or for example, 2 to 1000, the slope at Vin=0 can still be sufficient to perform a signal measurement with a read noise lower than the signal shot noise. Thus, the use of non-linear amplification can allow the use of the full input signal swing while reducing input referred noise in the range of low light intensities, therefore achieving potentially very high dynamic range surpassing, e.g., 100 dB.

Additionally or alternatively, amplifier comprising of passive devices such as resistors, as well as amplifiers comprising active current sources can be employed in order to achieve similar performance.

Figure 7:
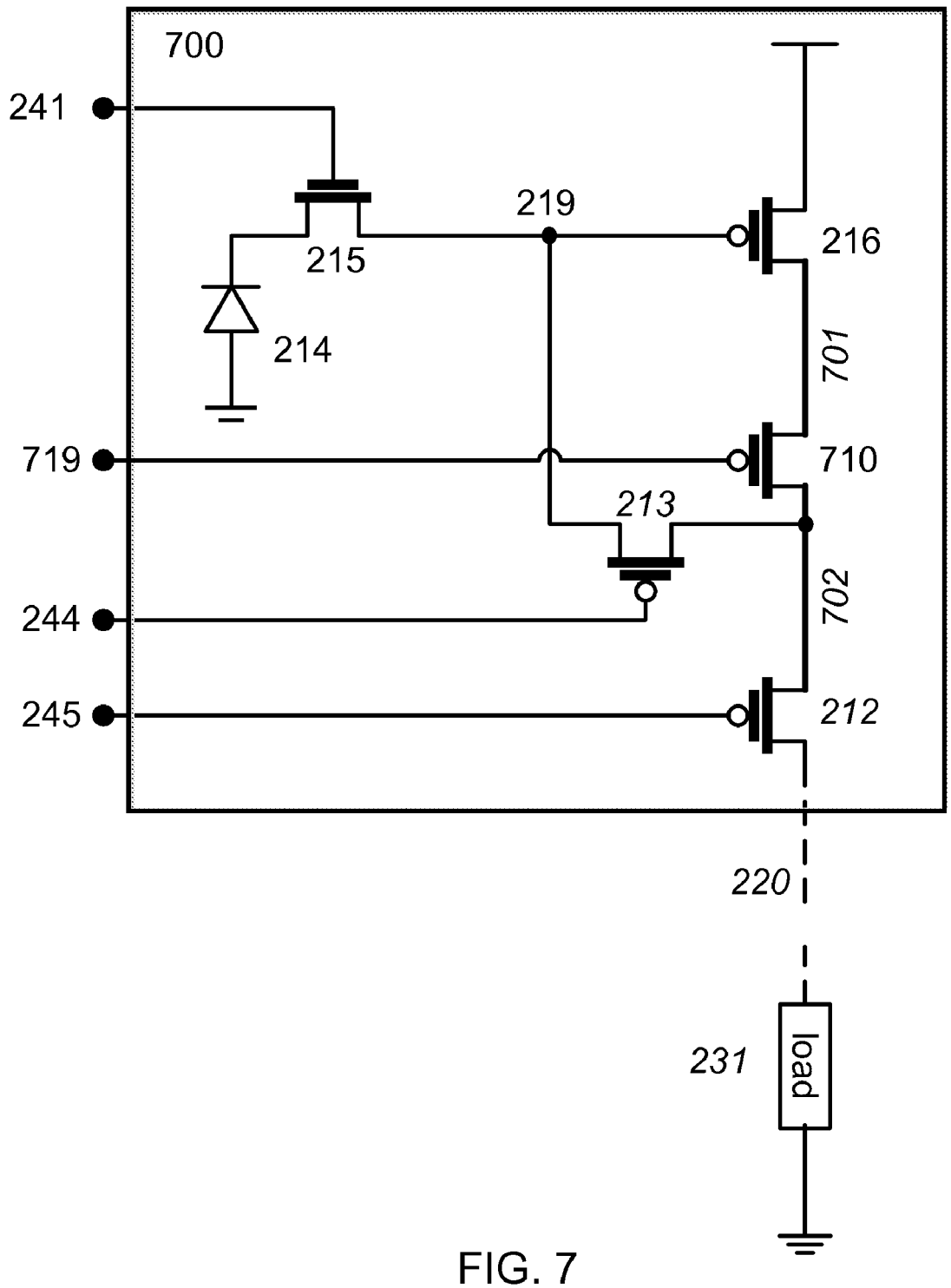
FIG. 7 is a schematic illustration of an imaging circuit according to an alternative embodiment of the invention, wherein the imaging circuit comprises a cascode transistor.

Referring now to FIG. 7, a pixel circuit 700 constituting another embodiment of pixel circuit 210 may include, in addition to amplifier input transistor 216, a cascode transistor 710 of the same type as amplifier input transistor 216, wherein cascode transistor 710 has its source connected to the drain of amplifier input transistor 216. The voltage applied to the cascode transistor gate 719 is chosen in order to operate cascode transistor 710 in saturated mode for an interval of sense node voltages comprising the reset voltage. The potential of a common node 701 connected to the drain of amplifier input transistor 216 and the source of cascode transistor 710 is, therefore, held nearly constant in said interval of input voltages. For this reason, cascode transistor 710 effectively suppresses the Miller effect due to the parasitic capacitance between node 701 and sense node 219, thereby allowing to keep the effective input capacitance low. The Miller effect between the sense node and output nodes 702 as well as 220 may still exist but using typical semiconductor fabrication technologies the corresponding parasitic capacitance values can be at least one order of magnitude lower than the capacitance between the sense node and the cascoded node 701, comprising the gate drain overlap capacitance of amplifier input transistor 216. Due to the use of cascode transistor 710 the capacitance from sense node 219 to node 701 and the effective capacitance from sense node 219 to output node 702 multiplied by Miller effect may both be one order of magnitude lower than the total sense node capacitance.

Figure 8:
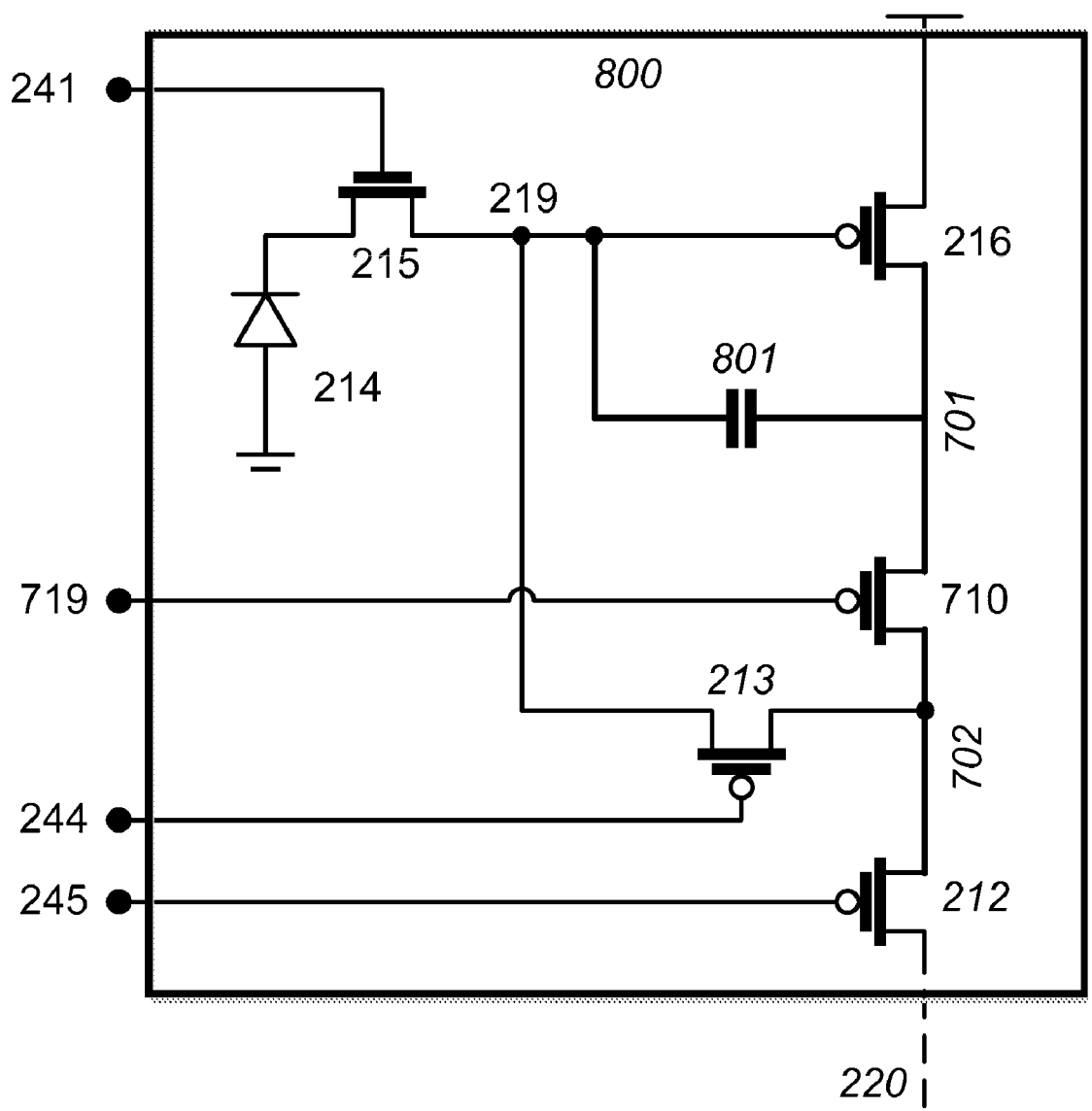
FIG. 8 is a schematic illustration of an imaging circuit according to yet another embodiment of the invention, in which the imaging circuit comprises a cascode transistor and a Miller capacitor.

Referring now to FIG. 8, a pixel circuit 800 being an embodiment of pixel circuit 210, is configured like pixel circuit 700, with the exception that pixel circuit 800 further comprises a Miller capacitor 801 connected between drain node 701 of amplifier input transistor 216 and sense node 219. For operating points close to the reset point 601, the effective sense node capacitance is increased by the value of Miller capacitor 801 only. For higher output voltages, however, cascode transistor 710 is no longer operated in saturation mode but enters its linear operation region, acting as a controlled resistor in series with select switch 212 and passing the output voltage swing to node 701. In this range of operating points, with the full output voltage swing (or even more) being present on node 701, Miller capacitor 801 increases the effective capacitance of sense node 219 by its value multiplied by the voltage gain of amplifier 211. The resulting important variation of the effective sense node capacitance brings a beneficial increase of input charge signal swing, therefore increasing the dynamic range of the image sensor by, for example, at least 10 dB.

Figure 9:
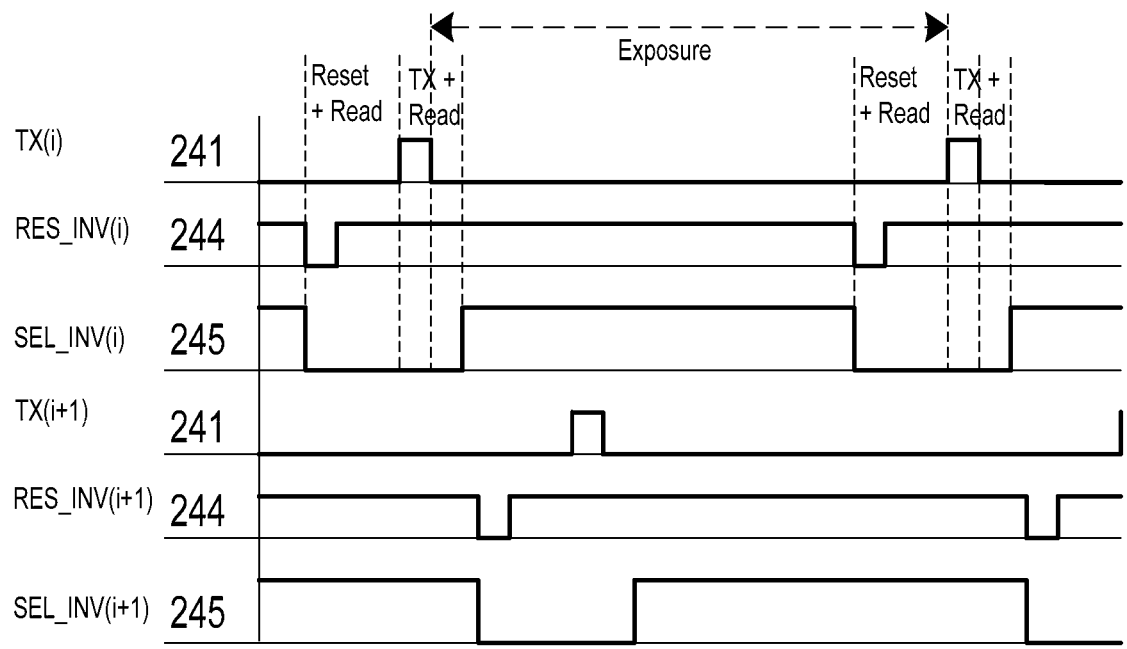
FIG. 9 is a schematic illustration of a control signal operating sequence suitable for being employed in embodiments of pixel circuits schematically illustrated in FIG. 3, FIG. 4, FIG. 7 and FIG. 8.

Reference is now made to FIG. 9, which schematically illustrates examples of sequences of operations of control signals such as the reset signals, charge transfer and select signals suitable for being operated in association with the embodiments that are schematically illustrated in FIG. 3, FIG. 7 and FIG. 8. During exposure and charge storage in the photosensitive devices of a plurality of pixel circuits, a shared inverted select control signal 245 of said pixels takes a high voltage in order to turn select switches 212 off, a shared inverted reset control signal 244 of the pixels takes a high voltage in order to turn reset switches 213 off, and the shared transfer control signal 241 takes a low voltage in order to turn charge transfer gates 215 off.

Next, pixel amplifier 211 and sense node 219 are reset by firstly assigning a low value (ranging from ground potential to a threshold voltage below the output voltage given by reset point 601 of amplifier 211) to inverted select control signal 245, thereby enabling amplifier 211 to operate appropriately, in case parts of amplifier 211 are shared among a plurality of pixels. Secondly, a sequence of a low value followed by a high value may be applied to inverted reset control signal 244, thereby temporarily applying negative feedback to amplifier 211 and resetting it to an operating point of high gain. The reset voltage level can now be read on pixel signal line 220.

Figure 4:
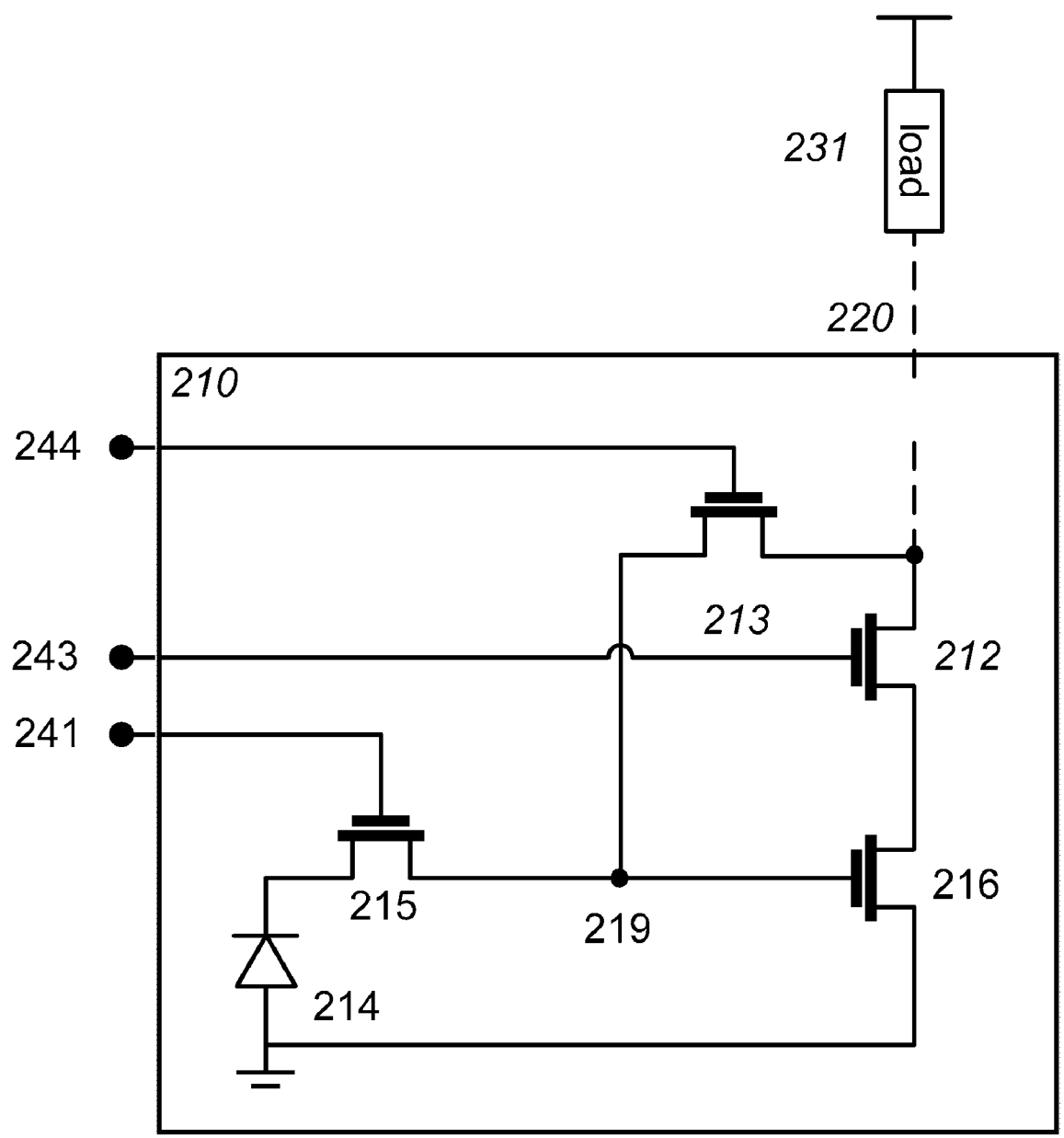
FIG. 4 is a schematic illustration of an imaging circuit according to another embodiment of the invention, wherein a pixel section thereof employs n-channel Metal Oxide Semiconductor (MOS) transistors.

Next, the signal charge is transferred from photo-sensitive device 214 to sense node 219 by applying a sequence of a high voltage followed by a low voltage to shared transfer control signal 241, while inverted select control signal 245 is still maintaining its low voltage. The next exposure cycle is now started, while the signal level correlated to the previously read reset level is available on pixel signal line 220. Finally, after reading the signal level, a high voltage is assigned to inverted select control signal 245. In this way, the plurality of pixel circuits connected to inverted select control signal 245 are isolated from their signal lines, which allows shared circuitry to be used by different pixel circuits. Embodiments employing MOS devices of different types such as the one that is schematically illustrated in FIG. 4 may require the inversion of some of the signal phases.

According to a further aspect of the present invention, a controlled slow signal transition edge of a duration of, for example, 10 ns to 100 microseconds, is used for opening reset switch 213 at the end of the reset action. This procedure allows maintaining negative feedback during the part of the gate signal transition of reset switch 213, where a charge channel is still present in the semiconductor underneath the gate of the transistor forming reset switch 213. Still driving sense node 219 to its intended reset value close to the supply voltage Vdd while the cross-talk capacitance of reset switch 213 is high, allows minimizing the amount of injected charge onto sense node 219 and therefore resets amplifier 211 as precisely as possible to the operating point defined by negative feedback operation, which provides high open loop gain for signals representing low optical intensities.

Figure 10:
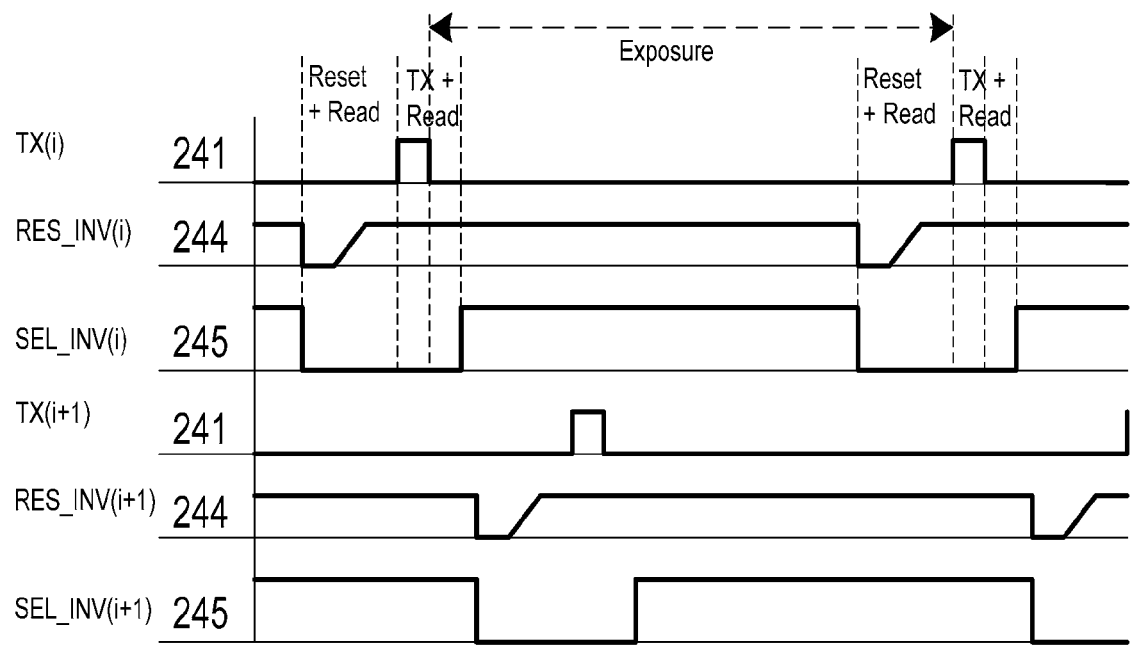
FIG. 10 is a schematic illustration of a control signal sequence implementing a reset signal operating method suitable for being employed in embodiments of pixel circuits which are schematically illustrated in FIG. 3, FIG. 4, FIG. 7 and FIG. 8.

With reference to FIG. 10, a control signal sequence is schematically illustrated, said control signal sequence implementing a reset signal operating method suitable for being employed in embodiments of pixel circuits that are schematically illustrated in FIG. 3, FIG. 7 and FIG. 8.

Figure 11:
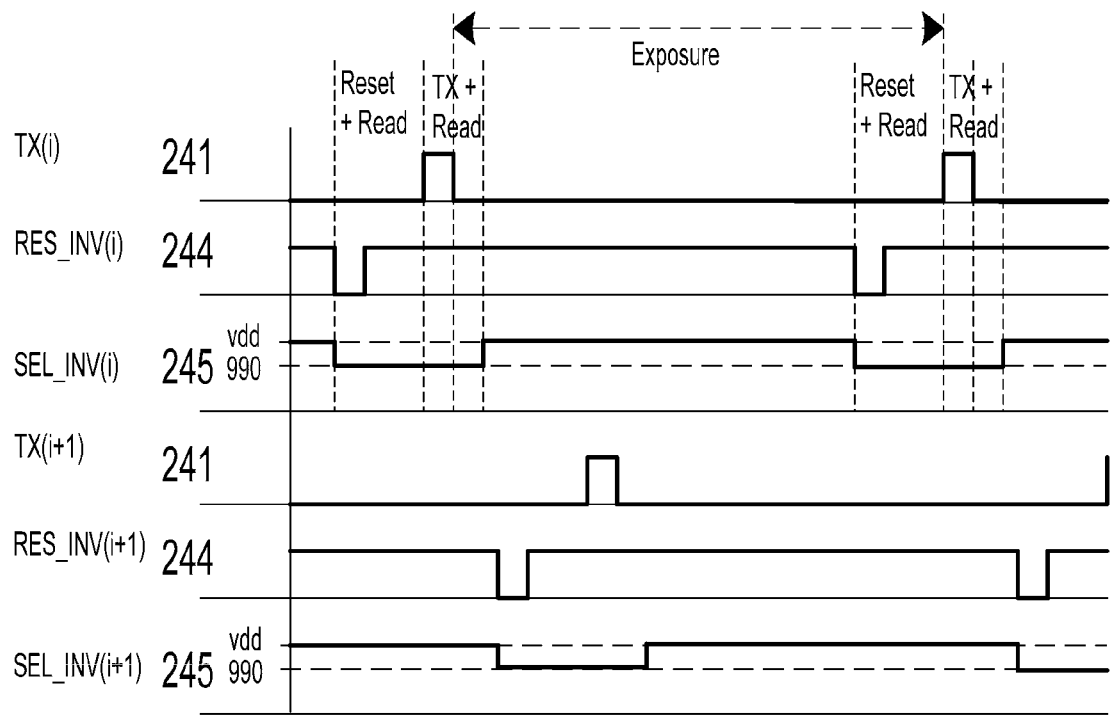
FIG. 11 is a schematic illustration of a control signal sequence implementing a select signal operating method, according some embodiments of the present invention.

Reference is now made to FIG. 11. According to a further aspect of the invention, an embodiment of pixel circuit 210 being MOS-cascode-free, like the one that is schematically illustrated in FIG. 3, is operated in a mode that configures select device 212 as a cascode transistor when pixel circuit 210 is selected and that, otherwise, configures select device 212 as an open switch.

As schematically illustrated in FIG. 11, this may be achieved by pulsing inverted select control signal 245 to a very high voltage close to the supply voltage when pixel circuit 210 is not selected. When pixel circuit 210 is selected, inverted select control signal 245 is pulsed to an appropriate gate voltage 990. Considering for instance the pixel circuit embodiment illustrated in FIG. 3, gate voltage 990 has to be chosen high enough to keep select device 212 in saturated mode for pixel output voltages (drain voltage of the select device) equal or close to the reset voltage. At the same time gate voltage 990 still has to be chosen low enough to make sure that the voltage on source node 218 of select device 212 is low enough to keep amplifier input transistor 216 in saturated mode for voltages on sense node 219 equal or close to the reset voltage. The term "equal" also encompasses the meaning of the term "substantially equal".

The beneficial effect of a dedicated cascode transistor such as 710 on the conversion factor of pixel circuit 210 can thus be realized by proper configuration of select device 212 without increasing the device count of pixel circuit 210. More specifically, the described method, using a similar principle as the embodiment schematically illustrated in FIG. 7, is able to efficiently reduce Miller effect between sense node 219 and any node on which the output signal is available such as pixel signal line 220. For a given pixel circuit, using the method may therefore provide significantly lowered effective capacitance of sense node 219 and correspondingly increased pixel conversion factor ($\Delta$Vout/$\Delta$Qin) (e.g. by 10%-30%) compared to pixel conversion factors of pixel circuits known in the art. For a sense node capacitance of, e.g., 1 femtoFarads to 10 femtoFarads, and (absolute) amplifier gain of, e.g., 5-50, the pixel conversion factor may be 80 $\mu$V per electron to 8 mV per electron, respectively. For the said exemplified sense node capacitance but for amplifier gain of about 2-1000, the conversion factor may be about 32 $\mu$V to 160 mV, respectively. The same beneficial effect as from dedicated cascode transistor such as 710 on the conversion factor of pixel circuit 210 can thus be realized by proper configuration of select device 212 without increasing the device count of pixel circuit 210.

It will be appreciated by persons skilled in the art that the disclosed technique is not limited to what has been particularly shown and described hereinabove.

The invention claimed is:

1. A pixel circuit comprising:
   a photo-sensitive device with charge storage capability connected to a sense node;
   an inverting amplifier of which at least a part thereof configured to amplify a voltage from said sense node to a voltage on an output node of said amplifier when being operated in open-loop configuration;
   a reset switch configured to connect the input and output nodes of said inverting amplifier and thus to reset said inverting amplifier to an operating point providing high open loop gain ranging from 2 to 1000 by at least temporarily establishing negative feedback; and
   a low-pass filter at the output node of said inverting amplifier, said low-pass filter limiting signal frequencies passing to the output node.

2. The pixel circuit according to claim 1, wherein said photo-sensitive device is connected to said sense node across a transfer gate enabling controlled complete charge transfer from the storage area of said photo-sensitive device to said sense node.

3. The pixel circuit according to claim 1 comprising a select switch for connecting said at least one pixel circuit to a signal line.

4. The pixel circuit according to claims 1, wherein said inverting amplifier is implemented by at least one of the following devices: MOS devices and passive circuit elements manufactured using CMOS processing technology.

5. The pixel circuit according to claim 1, wherein said transfer gate, said reset switch and, if present, said select switch, are implemented by MOS transistor devices.

6. The pixel circuit according to claim 1, wherein said inverting amplifier has a gain that increases with a corresponding decrease in the light intensity detected by said photo-sensitive device.

7. The pixel circuit according to claim 1, wherein said inverting amplifier part comprises at least one transistor device and a cascode transistor biased in a manner to keep a potential at the drain terminal of the amplifier input transistor nearly constant for a range of amplifier output voltages including the range corresponding to low intensities of the light detected by the photo-sensitive device.

8. A method of operating the pixel circuit according to claim 1 with a select switch control signal, said method comprising the following procedures:
   a) configuring, by a first value of said select switch control signal, said select switch, as an open switch to isolate said pixel circuit from a corresponding at least one pixel signal line;
   b) configuring, by a second value of said select switch control signal, said select switch as a cascode transistor to connect a pixel output signal to said corresponding at least one signal line; and
   c) providing reduced effective parasitic capacitance between said corresponding sense node and signal line for a range of output voltages of said inverting amplifier including the range corresponding to zero and low light intensities, whilst said pixel circuit is connected to said corresponding at least one signal line.

9. The pixel circuit according to claim 7 comprising a capacitor connected between said sense node and the drain terminal of said amplifier input transistor.

10. The method of operating said pixel circuit of claim 1 comprising the usage of a controlled slow edge, equal or slower than the settling time of said inverting amplifier, of the reset control signal for turning the reset action off in order to maintain negative feedback during a part of the reset signal transition.

11. A solid-state image sensor comprising a matrix of said pixel circuits according to claim 1.

12. The solid-state imaging sensor according to claim 11 comprising a plurality of control lines, wherein each control line is connected to a plurality of said pixel circuits allowing to control reset action, transfer action and select action of said pixel circuits.

13. The solid-state imaging sensor according to claim 11 furthermore comprising a plurality of shared pixel signal lines each one offering the possibility to be connected to a plurality of said pixels circuits.

14. The solid-state imaging sensor according to claim 11 comprising shared circuitry connected to said signal lines such as load devices, filtering capacitors and signal processing circuits.

15. The solid-state imaging sensor according to claim 14 wherein the functionality of each one of the plurality of signal processing circuits whereof each one is connected to one of the said pixel signal lines includes either one of the following: correlated double sampling (CDS) and correlated multiple sampling.

16. The solid-state imaging sensor according to claim 12 furthermore comprising a plurality of shared pixel signal lines each one offering the possibility to be connected to a plurality of said pixels circuits.

* * * * *

UNITED STATES PATENT AND TRADEMARK OFFICE
CERTIFICATE OF CORRECTION

| | | |
|---|---|---|
| PATENT NO. | : 8,119,972 B2 | |
| APPLICATION NO. | : 12/512307 | |
| DATED | : February 21, 2012 | |
| INVENTOR(S) | : Christian Lotto | |

It is certified that error appears in the above-identified patent and that said Letters Patent is hereby corrected as shown below:

Column 1, Line 17 the phrase "to solid-state image sensor"
should read --to solid-solid state image sensors--

Column 6, Line 1 the term "TCDS"
should read -- $T_{CDS}$ --

Signed and Sealed this
Twenty-ninth Day of May, 2012

David J. Kappos
*Director of the United States Patent and Trademark Office*